(12) United States Patent
Sima et al.

(10) Patent No.: US 7,765,597 B2
(45) Date of Patent: Jul. 27, 2010

(54) INTEGRATED CRAWLING AND AUDITING OF WEB APPLICATIONS AND WEB CONTENT

(75) Inventors: Caleb Sima, Woodstock, GA (US);
Steve Millar, Dawsonville, GA (US);
Raymond Kelly, Loganville, GA (US);
Bryan Sullivan, Duluth, GA (US);
Gerald Sullivan, Roswell, GA (US);
David Tillery, Woodstock, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 11/461,766

(22) Filed: Aug. 1, 2006

(65) Prior Publication Data

US 2007/0061877 A1    Mar. 15, 2007

Related U.S. Application Data

(63) Continuation-in-part of application No. 11/056,928, filed on Feb. 11, 2005.

(60) Provisional application No. 60/543,626, filed on Feb. 11, 2004.

(51) Int. Cl.
*G06F 21/00* (2006.01)
(52) U.S. Cl. ............................ 726/25; 713/188; 707/709
(58) Field of Classification Search ................. 726/12, 726/22–25, 5; 725/25; 713/164, 188; 707/709, 707/710, 781; 712/201
See application file for complete search history.

(56) References Cited

U.S. PATENT DOCUMENTS

| 5,032,979 | A  | 7/1991  | Hecht et al. |
|-----------|----|---------|--------------|
| 5,485,409 | A  | 1/1996  | Gupta et al. |
| 5,812,763 | A  | 9/1998  | Teng |
| 5,850,516 | A  | 12/1998 | Schneier |
| 5,892,903 | A  | 4/1999  | Klaus |
| 5,931,946 | A  | 8/1999  | Terada et al. |
| 6,088,804 | A  | 7/2000  | Hill et al. |
| 6,185,689 | B1 | 2/2001  | Todd, Sr. et al. |
| 6,205,551 | B1 | 3/2001  | Grosse |
| 6,205,552 | B1 | 3/2001  | Fudge |
| 6,263,444 | B1 | 7/2001  | Fujita |
| 6,269,447 | B1 | 7/2001  | Maloney et al. |
| 6,282,546 | B1 | 8/2001  | Gleichauf et al. |
| 6,298,445 | B1 | 10/2001 | Shostack et al. |
| 6,301,668 | B1 | 10/2001 | Gleichauf et al. |
| 6,321,338 | B1 | 11/2001 | Porras et al. |
| 6,338,141 | B1 | 1/2002  | Wells |
| 6,484,262 | B1 | 11/2002 | Herzi |
| 6,499,107 | B1 | 12/2002 | Gleichauf et al. |

(Continued)

OTHER PUBLICATIONS

Sima et al., Office Action dated Jul. 8, 2008, U.S. Appl. No. 11/461,767, 11 p.

(Continued)

*Primary Examiner*—Gilberto Barron, Jr.
*Assistant Examiner*—Hadi Armouche

(57) ABSTRACT

A vulnerability assessment tool that is operative to analyze web sites by simultaneously operating a crawling process and an audit process. Once the crawling process is invoked, the results are provided to the audit process. The audit process, rather than waiting until the crawl process is completed, simultaneously audits the web site based on the already provided crawl results. The results of the audit are also fed back to the crawl process to further enhance the crawl.

15 Claims, 5 Drawing Sheets

U.S. PATENT DOCUMENTS

| | | | |
|---|---|---|---|
| 6,535,227 | B1 | 3/2003 | Fox et al. |
| 6,546,493 | B1 | 4/2003 | Magdych et al. |
| 6,550,012 | B1 | 4/2003 | Villa et al. |
| 6,574,737 | B1 | 6/2003 | Kingsford et al. |
| 6,584,569 | B2 | 6/2003 | Reshef et al. |
| 6,631,473 | B2 | 10/2003 | Townsend |
| 6,839,850 | B1 * | 1/2005 | Campbell et al. ............ 726/23 |
| 6,996,845 | B1 * | 2/2006 | Hurst et al. .................. 726/25 |
| 7,360,092 | B1 | 4/2008 | Peterson et al. |
| 2002/0010855 | A1 * | 1/2002 | Reshef et al. ............... 713/164 |
| 2002/0023122 | A1 | 2/2002 | Polizzi et al. |
| 2003/0233581 | A1 | 12/2003 | Reshef et al. |
| 2005/0138426 | A1 | 6/2005 | Styslinger |
| 2005/0188423 | A1 * | 8/2005 | Motsinger et al. ............ 726/22 |
| 2005/0198099 | A1 * | 9/2005 | Motsinger et al. ........... 709/200 |
| 2006/0282494 | A1 * | 12/2006 | Sima et al. .................. 709/200 |
| 2007/0061877 | A1 * | 3/2007 | Sima et al. .................... 726/12 |

OTHER PUBLICATIONS

Sima et al., Office Action dated Jan. 29, 2009, U.S. Appl. No. 11/461,767, 11 p.

Sima, C., Office Action dated Feb. 22, 2008, U.S. Appl. No. 11/056,928, 11 p.

Sima, C., Final Office Action dated Jul. 22, 2008, U.S. Appl. No. 11/056,928, 10 p.

Sima, C., Office Action dated Feb. 20, 2009, U.S. Appl. No. 11/056,928, 13 p.

C. Sima, Office Action dated Jul. 8, 2008, U.S. Appl. No. 11/461,767, filed Aug. 1, 2006.

C. Sima, Response to Office Action dated Jul. 8, 2008, filed Oct. 8, 2008, U.S. Appl. No. 11/461,767, filed Aug. 1, 2006.

C. Sima, Office Action dated Jan. 29, 2009, U.S. Appl. No. 11/461,767, filed Aug. 1, 2006.

C. Sima, Office Response to Action dated Jan. 29, 2009, filed Apr. 29, 2009, U.S. Appl. No. 11/461,767, filed Aug. 1, 2006.

C. Sima, Final Office Action dated Jul. 16, 2009, U.S. Appl. No. 11/461,767, filed Aug. 1, 2006.

C. Sima, Appeal Brief filed Dec. 15, 2009, U.S. Appl. No. 11/461,767, filed Aug. 1, 2006.

C. Sima, Examiner's Answer dated Mar. 4, 2010, U.S. Appl. No. 11/461,767, filed Aug. 1, 2006.

C. Sima, Reply Brief filed May 3, 2010, U.S. Appl. No. 11/461,767, filed Aug. 1, 2006.

C. Sima, Office Action dated Feb. 22, 2008, U.S. Appl. No. 11/056,928, filed Feb. 11, 2005.

C. Sima, Response to Office Action dated Feb. 22, 2008, filed Apr. 10, 2008, U.S. Appl. No. 11/056,928, filed Feb. 11, 2005.

C. Sima, Final Office Action dated Jul. 22, 2008, U.S. Appl. No. 11/056,928, filed Feb. 11, 2005.

C. Sima, Pre-Appeal Brief Request for Review filed Oct. 22, 2008, U.S. Appl. No. 11/056,928, filed Feb. 11, 2005.

C. Sima, Notice of Panel Decision from Pre-Appeal Brief Review dated Dec. 4, 2008, filed Apr. 10, 2008, U.S. Appl. No. 11/056,928, filed Feb. 11, 2005.

C. Sima, Office Action dated Feb. 20, 2009, U.S. Appl. No. 11/056,928, filed Feb. 11, 2005.

C. Sima, Response to Office Action dated Feb. 20, 2009, filed May 19, 2009, U.S. Appl. No. 11/056,928, filed Feb. 11, 2005.

C. Sima, Final Office Action dated Aug. 17, 2009, U.S. Appl. No. 11/056,928, filed Feb. 11, 2005.

C. Sima, Amendment after Notice of Appeal but before filing Appeal Brief filed Dec. 10, 2009, U.S. Appl. No. 11/056,928, filed Feb. 11, 2005.

C. Sima, Appeal Brief filed Jan. 4, 2010, U.S. Appl. No. 11/056,928, filed Feb. 11, 2005.

C. Sima, Advisory Action dated Jan. 28, 2010, U.S. Appl. No. 11/056,928, filed Feb. 11, 2005.

C. Sima, Examiner's Answer dated Apr. 16, 2010, U.S. Appl. No. 11/056,928, filed Feb. 11, 2005.

* cited by examiner

INTEGRATED CRAWLING AND AUDITING OF WEB APPLICATIONS AND WEB CONTENT

CROSS-REFERENCE TO RELATED APPLICATIONS

This application for a United States Patent is a continuation-in-part of U.S. patent application entitled SYSTEM AND METHOD FOR TESTING WEB APPLICATIONS WITH RECURSIVE DISCOVERY AND ANALYSIS filed on Feb. 11, 2005 and assigned Ser. No. 11/056,928, which claims the benefit of the filing date of United States Provisional Application for Patent that was filed on Feb. 11, 2004 with the title of "SYSTEM AND METHOD FOR TESTING WEB APPLICATIONS WITH RECURSIVE DISCOVERY AND ANALYSIS" and assigned Ser. No. 60/543,626.

BACKGROUND OF THE INVENTION

The present invention relates to the field of web server vulnerability assessments and, more specifically, to an integrated crawl and auditing process for web servers and web applications.

In the world of high-tech, electronics and computer systems, as well as almost every consumer electronics device, the key marketing thrust is "make it smaller". Thus, the electronic products available to use are constantly shrinking in size. However, there are two aspects of the high-tech industry that are not only refusing to shrink, but indeed are actually growing at quite a rapid rate. These two aspects include memory capacities and software program and/or data. Fortunately, the physical sizes of memory devices are shrinking. It would be quite a daunting sight to see a 600 Gigabyte drive 15 years ago.

And what is all this memory being used for? A good portion of it is being consumed by increasingly sophisticated and complex web sights. The typical 1-2 Megabyte, limited page web site is being replace by huge, intricate and detailed web sites full of web applications, data stores, information and the like.

Unfortunately, the free exchange of information, so easily facilitated by personal computers over the Internet, has spawned a variety of risks for the organizations that host that information. This threat is most prevalent in interactive applications hosted on the World Wide Web and accessible by almost any personal computer located anywhere in the world. Web applications can take many forms: an informational Web site, an intranet, an extranet, an e-commerce Web site, an exchange, a search engine, a transaction engine, or an e-business. These applications are typically linked to computer systems that contain weaknesses that can pose risks to a company. Weaknesses can exist in system architecture, system configuration, application design, implementation configuration, and operations. The risks include the possibility of incorrect calculations, damaged hardware and software, data accessed by unauthorized users, data theft or loss, misuse of the system, and disrupted business operations.

As the digital enterprise embraces the benefits of e-business, the use of Web-based technology will continue to grow. Corporations today use the Web as a way to manage their customer relationships, enhance their supply chain operations, expand into new markets, and deploy new products and services to customers and employees. However, successfully implementing the powerful benefits of Web-based technologies can be greatly impeded without a consistent approach to Web application security.

It may surprise industry outsiders to learn that hackers routinely attack almost every commercial Web site, from large consumer e-commerce sites and portals to government agencies such as NASA and the CIA. In the past, the majority of security breaches occurred at the network layer of corporate systems. Today, however, hackers are manipulating Web applications inside the corporate firewall, enabling them to access and sabotage corporate and customer data. Given even a tiny hole in a company's Web-application code, an experienced intruder armed with only a Web browser (and a little determination) can break into most commercial Web sites.

The problem is much greater than industry watchdogs realize. Many U.S. businesses do not even monitor online activities at the Web application level. This lack of security permits even attempted attacks to go unnoticed. It puts the company in a reactive security posture, in which nothing gets fixed until after the situation occurs. Reactive security could mean sacrificing sensitive data as a catalyst for policy change.

A new level of security breach has begun to occur through continuously open Internet ports (port 80 for general Web traffic and port 443 for encrypted traffic). Because these ports are open to all incoming Internet traffic from the outside, they are gateways through which hackers can access secure files and proprietary corporate and customer data. While rogue hackers make the news, there exists a much more likely threat in the form of online theft, terrorism, and espionage.

Today the hackers are one step ahead of the enterprise. While corporations rush to develop their security policies and implement even a basic security foundation, the professional hacker continues to find new ways to attack. Most hackers are using "out-of-the-box" security holes to gain escalated privileges or execute commands on a company's server. Simple misconfigurations of off-the-shelf Web applications leave gaping security vulnerabilities in an unsuspecting company's Web site.

Passwords, SSL and data-encryption, firewalls, and standard scanning programs may not be enough. Passwords can be cracked. Most encryption protects only data transmission; however, the majority of Web application data is stored in a readable form. Firewalls have openings. Scanning programs generally check networks for known vulnerabilities on standard servers and applications, not proprietary applications and custom Web pages and scripts.

Programmers typically don't develop Web applications with security in mind. What's more, most companies continue to outsource the majority of their Web site or Web application development using third-party development resources. Whether these development groups are individuals or consultancies, the fact is that most programmers are focused on the "feature and function" side of the development plan and assume that security is embedded into the coding practices. However, these third-party development resources typically do not have even core security expertise. They also have certain objectives, such as rapid development schedules, that do not lend themselves to the security scrutiny required to implement a "safe solution."

Manipulating a Web application is simple. It is often relatively easy for a hacker to find and change hidden fields that indicate a product price. Using a similar technique, a hacker can also change the parameters of a Common Gateway Interface (CGI) script to search for a password file instead of a product price. If some components of a Web application are not integrated and configured correctly, such as search functionality, the site could be subject to buffer-overflow attacks that could grant a hacker access to administrative pages. Today's Web-application coding practices largely ignore some of the most basic security measures required to keep a company and its data safe from unauthorized access.

Developers and security professionals must be able to detect holes in both standard and proprietary applications. They can then evaluate the severity of the security holes and propose prioritized solutions, enabling an organization to protect existing applications and implement new software quickly. A typical process involves evaluating all applications on Web-connected devices, examining each line of application logic for existing and potential security vulnerabilities.

A Web application attack typically involves five phases: port scans for default pages, information gathering about server type and application logic, systematic testing of application functions, planning the attack, and launching the attack. The results of the attack could be lost data, content manipulation, or even theft and loss of customers.

A hacker can employ numerous techniques to exploit a Web application. Some examples include parameter manipulation, forced parameters, cookie tampering, common file queries, use of known exploits, directory enumeration, Web server testing, link traversal, path truncation, session hijacking, hidden Web paths, Java applet reverse engineering, backup checking, extension checking, parameter passing, cross-site scripting, and SQL injection.

Assessment tools provide a detailed analysis of Web application and site vulnerabilities. FIG. 1 is a system diagram of a typical structure for an assessment tool. Through the Web Assessment Interface 100, the user designates which application, site or Web service resident on a web server or destination system 110 available over network 120 to analyze. The user selects the type of assessment, which policy to use, enters the URL, and then starts the process.

The assessment tool uses software agents 130 to conduct the vulnerability assessment. The software agents 130 are composed of sophisticated sets of heuristics that enable the tool to apply intelligent application-level vulnerability checks and to accurately identify security issues while minimizing false positives. The tool begins the crawl phase of the application using software agents to dynamically catalog all areas. As these agents complete their assessment, findings are reported back to the main security engine through assessment database 140 so that the results can be analyzed. The tool then enters an audit phase by launching other software agents that evaluate the gathered information and apply attack algorithms to determine the presence and severity of vulnerabilities. The tool then correlates the results and presents them in an easy to understand format to the reporting interface 150.

However, Web sites that extend beyond the rudimentary level of complexity that simply includes HTML to be rendered by a browser, can include a variety of sophisticated elements such as JAVA code, applets, Web applications, etc. The traditional approach of crawling through the HTML of a Web site is limited in the amount of information that can be obtained and analyzed. For instance, a Web site may include a PDF file that includes, within the text of the PDF file, additional links. The traditional Web crawler technology may obtain the link to the PDF file during the crawling phase of the attack, but the links embedded within the PDF file would be ignored during the second phase of the attack.

FIG. 2 is a block diagram showing the flow of operations for a prior art system that conducts a two-phased vulnerability assessment including a crawling phase and an auditing phase. Initially, a crawler 210 is configured 201 to initiate the crawling phase of the assessment. Once configured, the crawler 210 begins making discovery requests 202 to the web server 200. Each request results in a response 203 which is then stored into database 230. Feedback 204 may be provided to the crawler 210 to further configure or augment the operation of the crawler 210. Thus, the crawling phase consists of multiple trips through the process identified as Loop 1 which consists of multiple sessions, where each session includes a discovery request 202 followed by a response 203 and possible feedback 204.

Once the crawling phase is completed, the auditing phase commences. During the auditing phase, the auditor 220 is configured 205 based on data stored in database 230 during the crawling phase. The auditor 220 then makes attack requests 206 against the web server 200. Each attack request results in obtaining a response 207 which is then stored into the database 230. Thus, the auditing phase consists of one or more trips through the process identified as Loop 2 which consists of one or more sessions, where each session includes an attack request 206 followed by a response 207 and further configuration 205 as necessary.

As described in the parent application, the crawling process can be quite intensive and if a recursive crawl is implemented, the amount of data accumulated during the discovery and response sessions can be quite large. In addition, with the complexity of modern-day web sites, the crawling process can take a considerable amount of time. Thus, with a two-phased approach, a user may have to wait on the order of hours, or even days before he can start to see results from the auditing process. In addition, for larger web sites, there is a risk of data overflow as the crawler generates excessive amounts of data.

Thus, there is a need in the art for a solution that can provide a more efficient and expedient mechanism to perform a vulnerability assessment and to obtain auditing results during a vulnerability assessment.

SUMMARY OF THE INVENTION

In general, the present invention includes a system and method for conducting a vulnerability assessment of a target object, such as a web site, a web application or the like. More specifically, an embodiment of the present invention performs a vulnerability assessment of a target object by first identifying or receiving the identity of the target object (i.e., a URL). Once the target is identified, a crawling process, either from scratch or pre-loaded, is initialized to start a crawl of the target object. The results from the crawl, as well as any preloaded information, are placed into a memory device that is accessible by an audit process. The audit process is initiated while the crawling process is still in operation. The audit process extracts the stored results of the crawling process from the memory storage device and begins the audit using this information. As audit results are obtained, the results can be stored into the memory device and then provided to a user interface for review. Advantageously, the present invention allows for the audit process to obtain auditing results that can then be provided to a user in an expedient manner (i.e., before the entire crawl is completed). In addition, the audit results may also be fed into the crawling process. Because the audit process can uncover additional structure information about a target object, the simultaneous operation of the crawl and audit processes advantageously enables the crawl to be more thorough.

In another embodiment, the processing power allocated between the crawling process and the auditing process can be regulated to further optimize the provision of results of the vulnerability assessment. For instance, the crawl results can be stored in a queue in the memory device. Once the size of the queue reaches a threshold value, the audit process can begin. If the queue reaches a second threshold value, the processing power allocated to the crawling process can be reduced relative to the auditing process. If the queue drops below a minimum value, the processing power of the audit process can be reduced relative to the crawling process. Advantageously, this aspect of the present invention allows for the optimum performance of the vulnerability assessment.

DESCRIPTION OF THE INVENTION

The present invention is directed towards an integrated crawl and audit vulnerability assessment that advantageously provides vulnerability feedback early in the process even while the crawling process is being executed. In general, the present invention operates by integrating the crawling process and the auditing process in such a manner that they can run simultaneously. Using technology, such as multi-threading, the auditing process can run simultaneous or concurrently with the crawling process and provide vulnerability assessment feedback early during the process. Advantageously, this aspect of the present invention can enable a vulnerability assessment to be terminated early in the process if a severe vulnerability is detected. This allows the vulnerability to be fixed and then reinitiating of the vulnerability assessment without having to spend the vast amount of time to complete the entire crawl, only to discover that a severe vulnerability is present that must be fixed prior to running another vulnerability assessment.

Now turning to the figures in which like labels represent like elements through out the diagrams, various embodiments, aspects and features of the present invention are further described.

Figure 1:
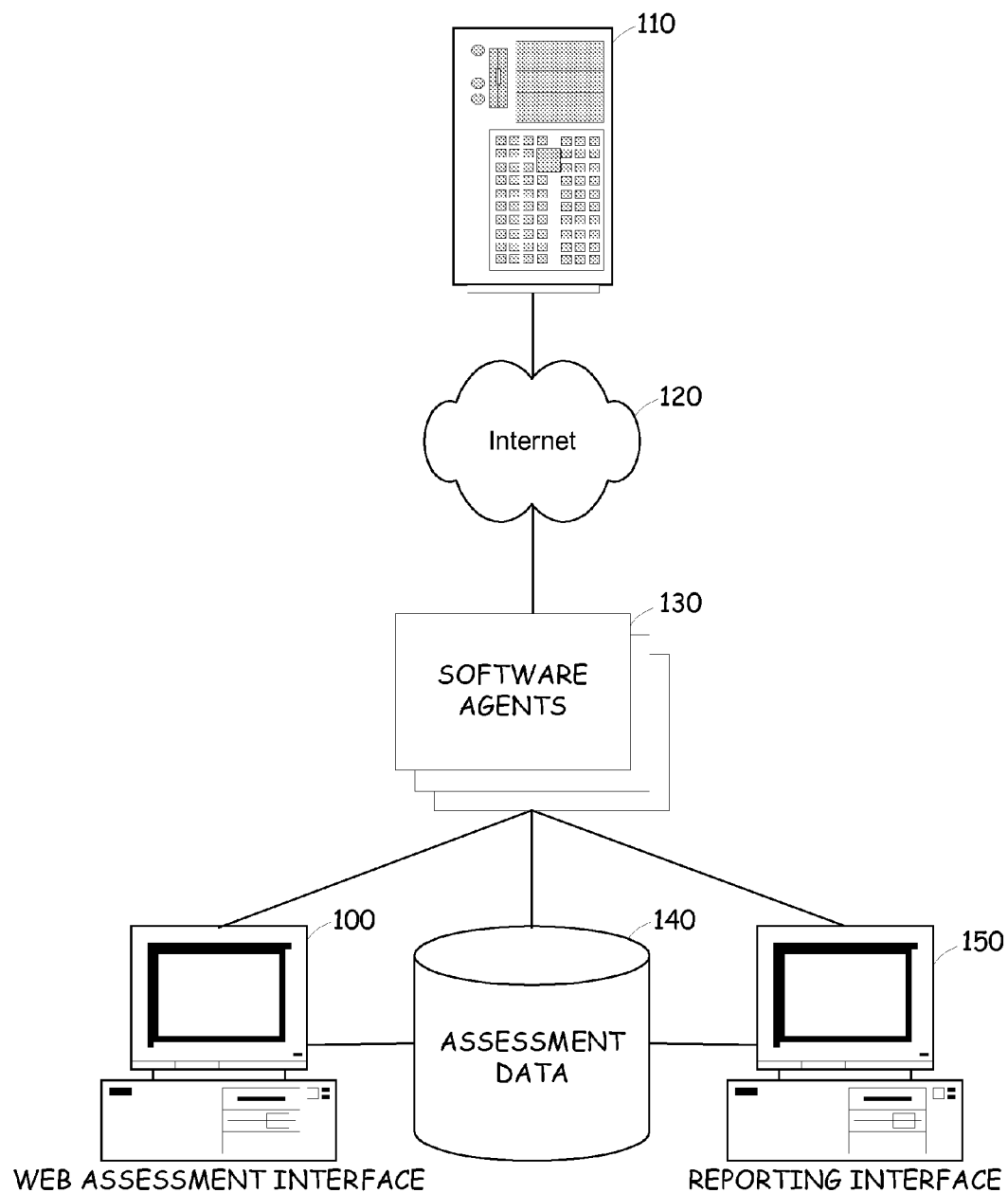
FIG. 1 is a system diagram of a typical structure for an assessment tool.
Figure 2:
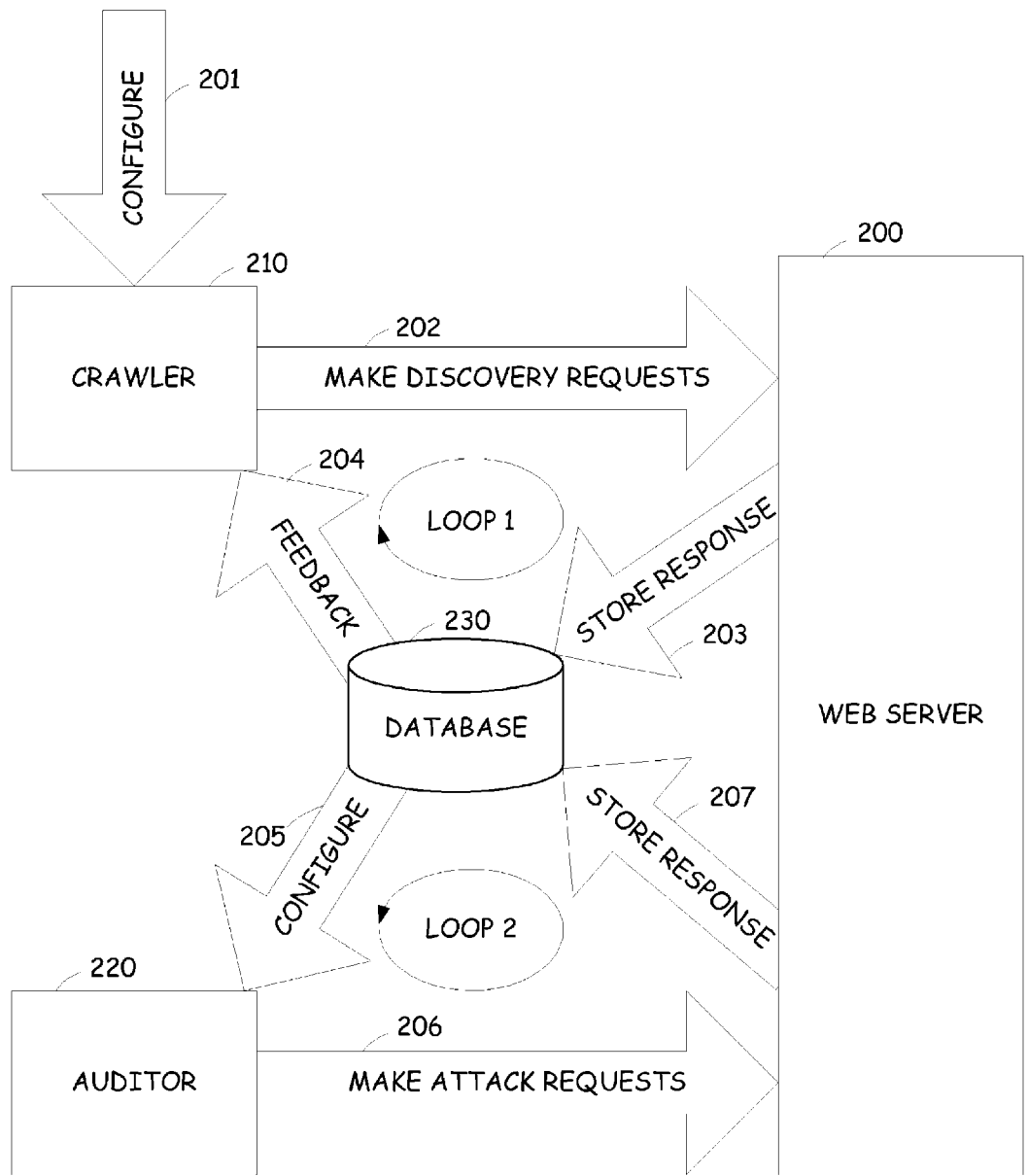
FIG. 2 is a block diagram showing the flow of operations for a prior art system that conducts a two-phased vulnerability assessment including a crawling phase and an auditing phase.
Figure 3:
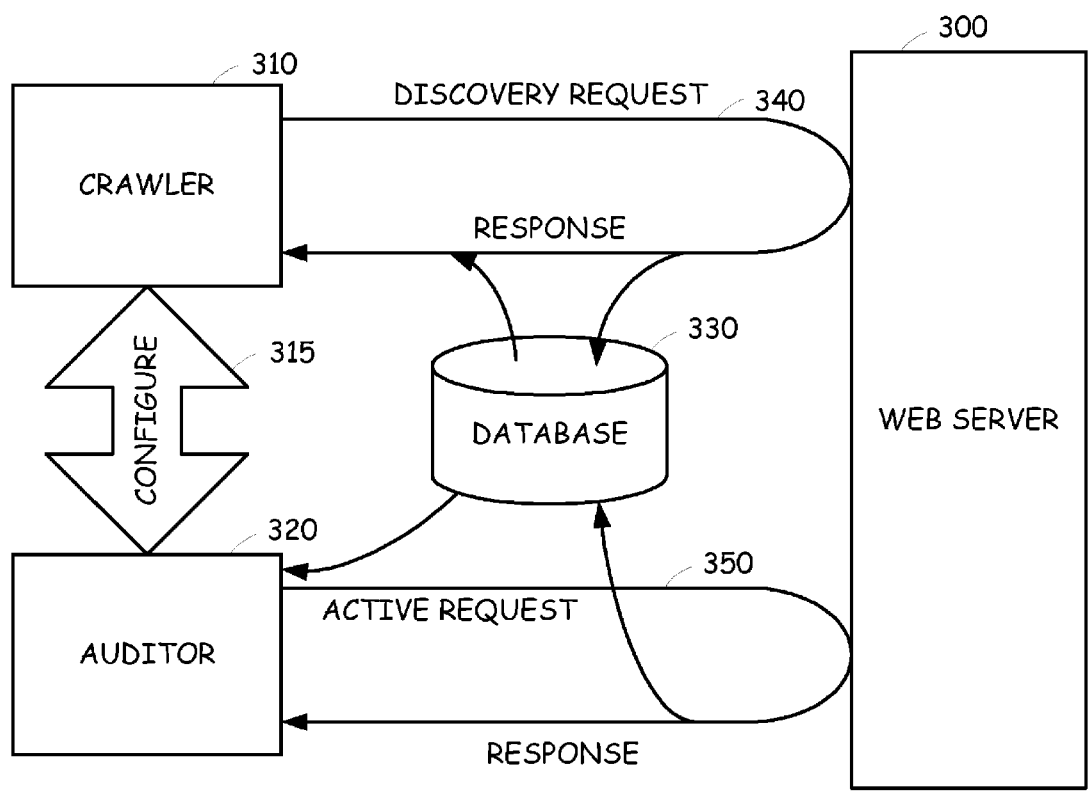
FIG. 3 is a block diagram showing the flow of operations for an embodiment of the present invention that conducts a simultaneous/integrated crawling and auditing vulnerability assessment.

FIG. 3 is a block diagram showing the flow of operations for an embodiment of the present invention that conducts an integrated crawling and auditing vulnerability assessment. A crawler process 310 and an auditor process 320 are initiated as concurrent processes, such as separate threads being executed by a single processor or multiple processors. The crawler process 310 and the auditor process 320 are both configured 315 at the onset to identify the target of the vulnerability assessment (i.e., the target web site URL on the web server 300) as well as other initial settings that may apply in various circumstances. For instance, the crawler process 310 may be initially loaded with structure information about the target.

The crawler process 310 begins a loop 340 that consists of one or more sessions with each session including a discovery request from which it obtains a response. The results are stored into the database 330 and can also be fed back into the crawler process 310 to further define the future operations of the crawl. The auditor process 320 pulls the data accumulated in the database 330 from the crawler process 310 as soon as it is detected and conducts a loop 350 that consists of one or more sessions with each session including an attack request from which it obtains a response. Thus, the present invention operates to provide audit results while the crawler process 310 is still conducting a crawl on the target. The responses received through the auditor process 320 are stored into the database 330 and as such, can be examined by the crawler process 310. Thus, the present invention enables the auditor process 320 to actually effect and augment the crawler process 310. Advantageously, this aspect of the present invention enables the typical crawler process, which is normally a benign or static process, to be a dynamic process. It should be appreciated that loop 340 and loop 350 are simultaneously performed in this embodiment.

Figure 4:
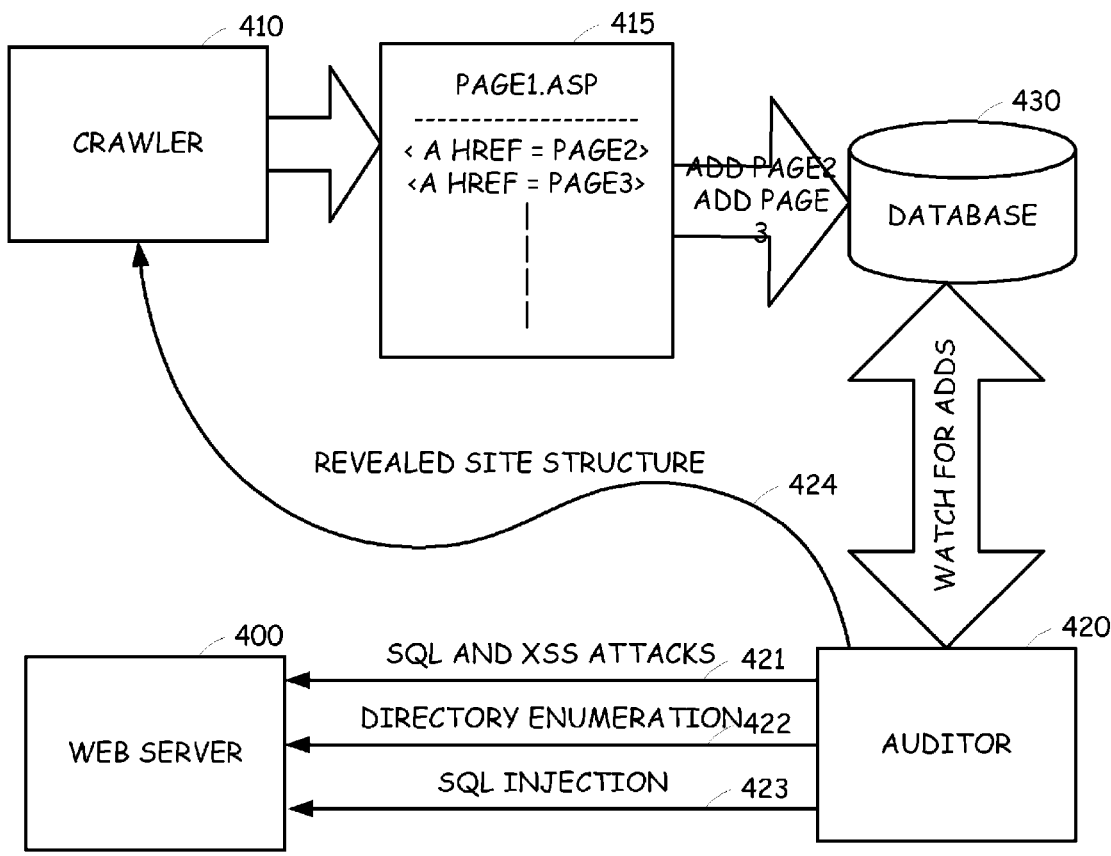
FIG. 4 is a flow diagram that further illustrates the impact of the present invention on the crawling process.

FIG. 4 is a flow diagram that further illustrates the impact of the present invention on the crawling process. The crawler process 410 is shown as conducting a crawl on a first page 415 of the web site housed in web server 400 where it discovers additional pages, applications, applets, JAVA scripts, etc. In the case of applications, applets, JAVA scripts etc., these can be run within the crawler process 410 to discover additional pages, links or other structure. Similarly, the web pages can be examined to identify additional pages, links or other structure. As each of these discoveries is further explored with discovery requests, the responses are placed into the database 430. The auditor process 420 continually monitors the database 430 to detect when items are added. As soon as this information is detected by the auditor process 420, various attacks based on this information can be launched against the target. As a non-limiting example, these attacks can include SQL and XSS attacks 421, directory enumerations 422 and SQL injections 423. As those skilled in the art will appreciate, such attacks can result in revealing addition structural information about the target that was not previously known or discovered through the crawler process 410. This information is then fed back to the crawler process 410 to further fuel the crawler process 410 operations.

Another aspect of the present invention is to implement a bounded queue on the crawler process 410, the auditor process 420 or both. The bounded queue is used to prevent data over-runs and to more efficiently allocate the processing power. For instance, if a bounded queue is implemented for the crawler process 410, once the queue reaches a threshold number of entries, processing power can be allocated from the crawler process 410 to the auditor process 420. Advantageously, this aspect of the present invention can operate to prevent data over-runs in the database as well as to more quickly provide audit results to the user. As another example, if a bounded queue is implemented for the auditor process 420, once the queue decreases to a threshold minimum number of entries, processing power can be allocated from the auditor process 420 to the crawler process 410 to ensure that the auditor process 420 is not sitting around in an idle state, wasting processing power, waiting for additional crawler process 410 additions to the database.

Now that the general operation of various aspects of the present invention have been presented, an exemplary embodiment and variations thereof are presented to show a suitable environment for implementing one or more of these various aspects of the present invention. In an exemplary embodiment of the present invention, the embodiment operates as a stand-alone windows user interface application that performs web server vulnerability assessment. This embodiment of the present invention overcomes and/or alleviates problems associated with prior art vulnerability assessment tools that were designed to operate in a monolithic fashion where the database, the user interface and the assessment code were all rolled into a single executable file. Such prior art systems were limited by the fact that only a single instance of the program can be running at a given time.

One aspect of this embodiment of the present invention is that it conforms to a classic three-tier design incorporating a user interface layer, an engine layer and a data provider layer. By completely separating the user interface code from the assessment engine (the component framework that does the crawling/auditing) multiple engines can be running on a single platform.

As an example of one embodiment of the present invention, the exemplary implementations of the various components are briefly described along with further detail of the operation of the embodiment.

The user interface component may include the following various interfaces. For instance, the user interface may include a start page for initiating primary tasks such as starting a new scan, generating a report on a completed scan, scheduling a scan, starting a web discovery (find web servers on the network), and opening a recent scan from a list. The user interface may also include a toolbar to expose common commands and/or a hierarchical menu bar to expose common commands. The user interface may also provide a session tree view that can show all crawled and audited URLs and provide context menu on selected nodes in the tree, show summary information about comments, cookies, scripts, client certificates, broken links, and offsite links. The user interface may also provide a sequence view that shows all crawled and audited URLs in the order the requests were made. In addition, the user interface may provide a session details view that shows the following information that pertains to the selected session in the session tree view: vulnerability information, browser view, HTTP request and response raw data, URL links on the page, and form data on the page. The user interface may include: an alerts view that shows all vulnerabilities found during the scan; an Info view that shows miscellaneous details pertaining to the server being scanned, a scan log view that shows scan engine execution details with time stamps, a 'Best Practices' view, a dashboard view that shows scan engine performance metrics in graphical form, settings editing controls to allow for detailed engine and scan configuration, and a tools menu that allows the user to launch external tools useful during assessment of a web server. The user interface may also allow the user to subscribe to a scan engine (s) and provide F1-activated help for common tasks.

The scan engine in the exemplary embodiment may provide command and control APIs for: starting/stopping/pausing scans, applying settings, retrieving performance data and retrieving scan data. The scan engine may also provide events to subscribers (client components) to inform them about: crawled URLs, vulnerabilities discovered, logins, logouts detected, file not found conditions, and scan completions. Several other capabilities may be found in the exemplary scan engine including, but not limited to, discovering and loading audit engine plugins and data provider plugins, defining external interfaces for use by data provider plugins and defining external signatures for use by subscribers.

The data provider in the exemplary embodiment may implement the data provider interface defined by the scan engine and create/read/update/delete scan data from a specific third party data store.

The exemplary embodiment can support several usage patterns. One such usage pattern is command line invocation. There are two modes of activating a scan via command line. In the first mode, the user types a line at the prompt and the scan runs unattended until completion. This scenario provides no opportunity for interaction and the user must view a report (if it was generated by the scan) or summary text at the prompt. The second mode is enabled by passing a specific command line switch which puts the user in 'command mode'. In this mode, the user can issue individual commands and will be notified in real time when interesting events occur (such as vulnerabilities being discovered). This scenario makes use of a separate executable program (not the user interface executable program) which instantiates the scan engine and configures it with settings specified in an external file.

Another usage pattern is a fully automated scan. Fully automated scans are setup and run in the user interface but left unattended until completion. Any form inputs required by pages being audited are provided by a preconfigured file. The user is free to pause and resume the scan but if left alone, the scan will complete without further user intervention.

Another usage pattern is the user interface fully interactive. Interactive scans run just like automated scans except that when the engine discovers a form that requires inputs it pauses and pops up the necessary user interface to collect the input data. After the data is input, the scan returns to automated mode until further input is required or the scan ends.

Another usage pattern is the user interface manual (step) mode. Step mode means that the user is solely responsible for navigating the site using a browser. The visited URLs are captured and audited automatically, but the complete crawl feature of automated scans is missing.

Another usage pattern is the automated scan with intermittent user interaction. A common scenario is for a user to run an automated scan but to watch the user interface as sessions are added to the site tree. In this case, the user may notice something of particular interest (a specific vulnerability found on a page for example) and choose to crawl and audit the site from that URL (crawl the URL and its children). In this case, the engine is sensitive to the user interface initiated crawl and suspends all automated crawling except that which resulted from the user selecting a URL and choosing crawl. When this operation completes, the scan engine resumes normal automated scanning.

Another usage pattern is scheduled scanning. The windows scheduler can be configured to start scans at pre-selected times. The scheduler simply invokes the command line utility to start the scan. The user interface executable program will provide scheduling screens that result in proper configuration of the windows scheduler service.

Finally, a remote invocation by AMP usage pattern may be included. The scan engine can be instantiated by an AMP sensor and used to control a scan. Alternatively, a 'listener' service that is installed with system can create an instance (in non-interactive mode) and configure it to take commands from AMP.

The exemplary embodiment of the present invention can perform vulnerability assessment on web servers by crawling and auditing in an integrated fashion. The scan engine can be instantiated and controlled by any .NET client code including (but not limited to): the user interface, the command tool line of the user interface, AMP sensors, visual studio add-in packages and QA product add-in modules.

Those skilled in the art will appreciate that crawling is the act of making HTTP requests, parsing the responses for additional URL links and recursively crawling those links as well. This process is automated and continues until all links have been requested. The crawler process in the present invention is a reusable .NET assembly that makes use of multi-threading and concurrent IO (multiple outstanding web requests). Crawling speed is an important aspect of any vulnerability assessment tool and the present invention operates to provide a scalable crawling architecture. Scalable crawling involves multiple crawlers (perhaps on multiple machines) conducting a coordinated navigation of an entire site under the control of a single crawl manager. Although the present invention is primarily described as only supporting a single crawler and crawl manager, it is anticipated that the present invention can also be incorporated into a distributed crawling environment or utilize multiple crawling processes.

Parsing links from responses is an important part of crawling. The present invention introduces several novel link parsers to maximize the number of links that crawls can find and supports proper multi-language (character set) decoding.

Those skilled in the art will also appreciate that auditing includes the process of programmatically examining HTTP request/response pairs—called sessions—and then sending additional HTTP requests for the purpose of attacking a web server. Successful attacks can result in vulnerability information that causes further auditing (more refined attacks) and/or further crawling (following new links found by the audits). Audit types are numerous and varied and more methodologies are discovered as time goes by, therefore, embodiments of the present invention include the ability for plugin audit engines. This aspect of the present invention allows incorporation of .Net assemblies that contain code designed to attack a web server in a very specific way (configurable by policies). These assemblies are discovered at runtime and the set of audit types can be extended via smart update. Smart update is an aspect of the present invention that enables the scan engine to understand plugin binaries and the versioning issues associated with them. Auditing is time consuming and large sites can demand distributed audits to efficiently perform the audit process. The various aspects of the present invention can be incorporated into and anticipate the use of distributed audits. In such an embodiment, a single audit manager coordinates the efforts of multiple auditor processes (perhaps on different machines). A single auditor discovers the set of policy-selected audit engines to use for attacking the web server. Although the present invention is primarily described as using a single auditor process and audit manager, multiple and/or distributed auditor processes are also anticipated.

Figure 5:
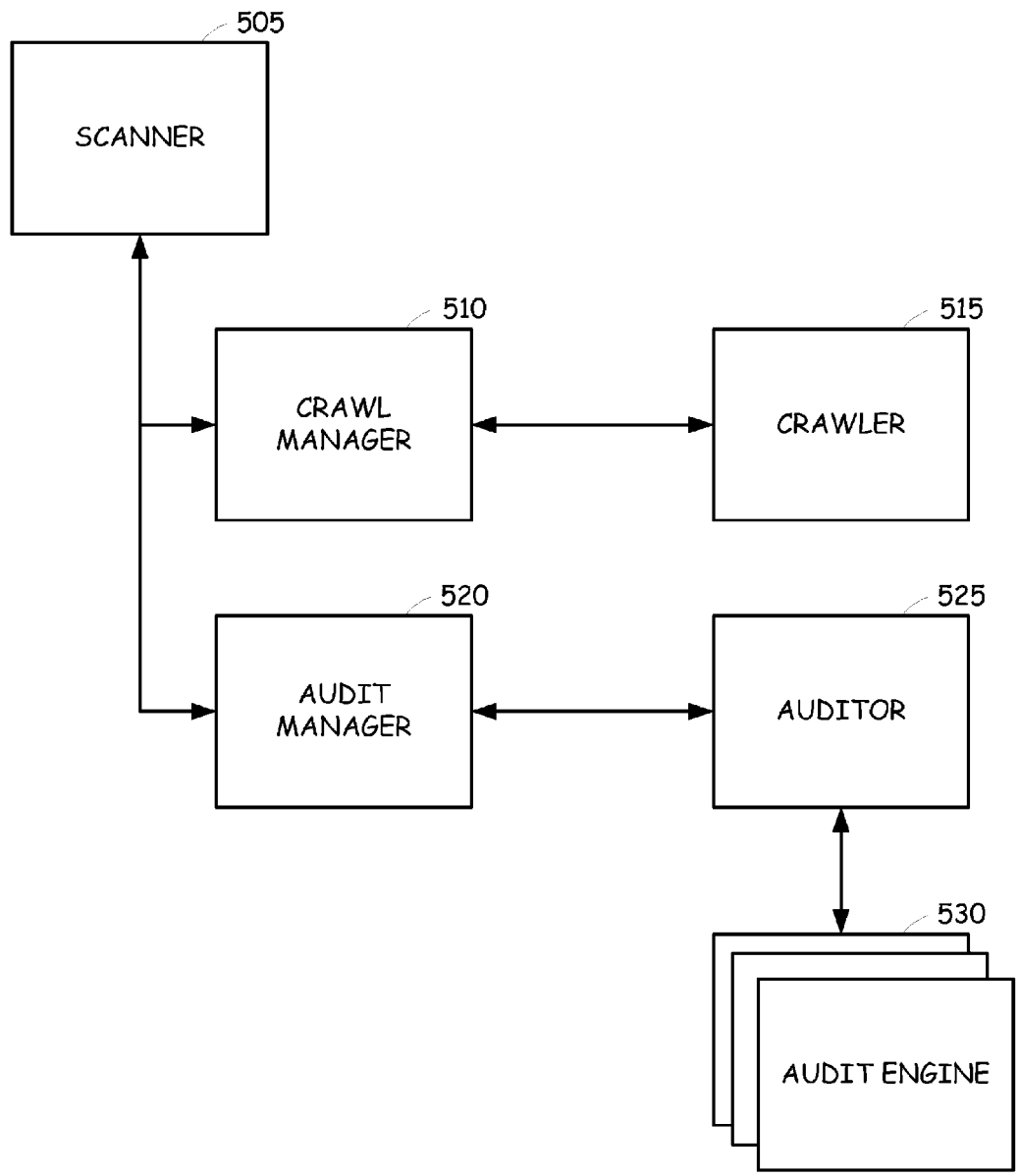
FIG. 5 is a block diagram illustrating a component breakdown of an object oriented implementation of a scan engine that incorporates aspects of the present invention.

FIG. 5 is a block diagram illustrating a component breakdown of an object oriented implementation of a scan engine that incorporates aspects of the present invention. The scan engine includes a scanner 505, a crawl manager 510, a crawler 515, an audit manager 520, an auditor 525 and one or more audit engines 530.

The scanner 505 is the entry point for clients to utilize or access the capabilities of the other engine components and is responsible for controlling all scans initiated by the client. Clients instantiate a scanner object, and interact with the scanner object 505 to manage the runtime behavior of the scan, such as starting, stopping, pausing, and resuming. The scanner object 505 can be created (empty) by a scanner, or hydrated from the database to access the session data in an existing scan.

The scanner object 505 will be initially configured with settings provided by a settings object passed in by the calling routine when the scanner is created. A scanner object 505 being created for a scan being restored (to be resumed by the user) will get its settings object from the scan framework. Clients can use the scanner object 505 to subscribe to events. Clients can also query for scan status.

The scanner object 505 may be able to manage a scan operating with the auditor and crawler components in either sequential or concurrent mode. Sequential operation includes a distinct crawl and audit phase. Concurrent operation starts a crawl using the crawl manager 510 but begins auditing as soon as sessions become available. The scanner 505 dispatches crawled sessions to the audit manager 520 for auditing.

The scanner 505 can be configured to allow the client to start, stop, save, restore and resume scans. The scan data and settings are persisted via the scan framework. In one embodiment the scanner 505 makes no distinction between HTTP requests that are web service method invocations and requests that are for normal web browsing of html (or asp, flash, etc) pages during the crawl but does make such distinctions during the audit process. Requests can happen as part of crawl or audit and vulnerable sessions are treated the same way by the engine.

The crawl manager 510 is responsible for starting and stopping crawls on individual crawler object instances. Embodiments of the present invention may support only a single crawler instance per crawl Manager, which must be local and in-process. Other embodiments may support multiple (possibly remote), crawlers per crawl manager. Advantageously, the distribution of cooperating crawlers spanning multiple machines may speed up crawling of large sites. Crawler events are collected and aggregated by the crawl manager 510 and raised to the scanner object.

The crawler 515 is the module that recursively crawls web sites and web services. As a request is made to the crawler 515 to crawl a URL, the URL is checked for validity and redundancy, and is then sent to a stateful request manager. The response obtained from the stateful request manager is parsed by a parser and any links obtained are then sent as additional crawl requests. An exemplary embodiment of the present invention supports four crawl modes: fully automatic, manual (step mode), page, and interactive. Interactive crawl will behave similarly to automatic crawl until a form is detected. At this point, the crawler will create a list of form values to be filled in, fire a "FormValuesRequired" event, and wait until a listener (normally the UI layer) returns the desired form values. The crawl will then continue in automatic mode.

The Audit Manager 520 relays audit requests to (and audit responses from) an auditor object instance 525. Embodiments of the present invention may support only a single auditor instance per audit manager which must be a local and in-process. Other embodiments may support multiple (possibly remote) auditors per audit manager. This aspect of the present invention advantageously allows an audit manager to manage a distributed set of auditors which are all attacking the same site.

The operation of an exemplary audit manager 520 runs groups of sessions against a single audit engine (i.e. Engine1->Session1, Engine1->Session2, Engine1->Session3, etc) and groups of engines will run against a single session (i.e. Engine1->Session1, Engine2->Session1, Engine3->Session1). Advantageously, this aspect of the present invention allows the distributed audit as described above, as well as allowing audits to run concurrently with the crawl, instead of having to wait for the crawl to finish before the audit phase begins. This methodology will allow a user to re-audit a single session without having to audit the entire scan. Certain audit engines may require all the sessions from the crawl. Such audit engines cannot be started until all crawling at that recursion level is complete.

An auditor 525 relays audit requests to (and audit responses from) audit engines 530. Thus, for an audit engine that is implemented as "plug-in" assembly, the main function of an auditor is to enumerate and instantiate policy-specified plugin assemblies, and then to act as a pass-through between those audit engines 530 and the audit manager 520. More specifically, the audit manager 520 does not make specific requests to audit engines 530 in this embodiment. Rather, the audit manager 520 makes requests to the auditor 525 which then passes the requests to each appropriate audit engine 530 in turn.

Because some audit engines detect attack signatures in responses other than the attack response (i.e. cross site scripting) it is necessary to reissue requests that occurred before such an attack was made. During a verify phase, all previously completed requests, which may have a response containing attack signatures (i.e. crawl requests), are re-requested and the resulting responses are passed to the audit engines.

The audit engines 530 may comprise a variety of engines and attack techniques. For instance, the audit engines 530 may include session audit engines which generate attacks from sessions. Vulnerability is detected in the response to the attack session. The audit engines 530 may also include server audit engines that generate attacks from servers and logic audit engines that generate attacks when a particular check is detected. In addition, the audit engines 530 may include indirect audit engines. Indirect audit engines, similar to session audit engines generate attacks from session; however vulnerabilities can be detected in responses of sessions other than simply the attack session.

It will be appreciated that the above described methods and embodiments may be varied in many ways, including, changing the order of steps, and the exact implementation used. The present invention has been described using detailed descriptions of embodiments thereof that are provided by way of example and are not intended to limit the scope of the invention. The described embodiments comprise different features and aspects, not all of which are required in all embodiments of the invention. Some embodiments of the present invention utilize only some of the features or aspects or possible combinations of thereof. Variations of embodiments of the present invention that are described and embodiments of the present invention comprising different combinations of features noted in the described embodiments will occur to persons of the art. The scope of the invention is limited only by the following claims.

What is claimed is:

1. A method for performing a vulnerability assessment of a target object, the method comprising the steps of:
    identifying a target object to assess;
    initiating a crawling process on the identified object;
    storing the results of the crawling process into a queue in a memory storage device;
    initiating an audit process while the crawling process is still in operation and additional results of the crawling process are being stored into the memory storage device;
    extracting one or more stored results of the crawling process from the memory storage device and providing them to the audit process;
    storing the results of the audit process into the memory storage device;
    extracting the stored results of the audit process from the memory storage device and providing them to the crawling process, while the crawling process is still in operation, for further crawling; and
    allocating processing power to the co-operating crawling process and the audit process based on the number of results existing in the queue.

2. The method of claim 1, wherein the target object is a web site and the step of identifying the target object comprises identifying a URL for the web site and the step of initiating a crawling process further comprises providing the URL to the crawling process.

3. The method of claim 2, wherein the step of initiating a crawling process further comprises examining the HTML and objects associated with the URL.

4. The method of claim 1, wherein the target object is a web application accessible at a URL, and the step of initiating a crawling process involves examining the web application.

5. The method of claim 1, wherein the step of initiating a crawling process comprises searching the target object for links, sessions and files.

6. The method of claim 1, wherein the step of initiating an audit process is performed as soon as a threshold number of results are stored into the queue.

7. The method of claim 6, further comprising the step of pausing the audit process when the number of results stored in the queue is less than a minimum number.

8. A system for assessing the vulnerability of a target object, the system comprising:
    a memory device;
    a crawler process, communicatively coupled to the memory device and operative to conduct a crawl of the target object and store the results of the crawl into the memory device;
    a scanner process, communicatively coupled to the crawler process and operative to invoke the crawler process by providing the identity of the target object;
    an audit process, communicatively coupled to the memory device and operative to conduct an audit simultaneously with the operation of the crawler process by extracting the results of the crawler process from the memory device while the crawler process continues to add new results to the memory device; and
    a plurality of audit engines invoked by the audit process and operative to perform various attacks on the target object,
    wherein the audit process is further operative to obtain attack results from the plurality of audit engines and provide at least a portion of the attack results as further input to the crawler process while the crawler process is still operating, and
    wherein the audit process is further operative to store the attack results into the memory device and the scanner process is further operative to allocate processing power between the crawling process and the auditing process based at least in part on the number of crawling results and attack results stored in the memory device.

9. The system of claim 8, wherein the at least a portion of the attack results provided to the crawler process are those attack results that reveal structure regarding the target object.

10. The system of claim 8, further comprising a user interface, the scanner is communicatively coupled to the user interface and the audit process and is further operative to receive attack results from the crawler process and the audit process and provide these results to the user interface, whereby the results of the audit process are available before the crawling process is completed.

11. The system of claim 8, wherein the scanner process is further operative to allocate processing power between the crawling process and the auditing process.

12. The system of claim 8, wherein the audit process is operative to conduct the audit simultaneously with the operation of the crawler process only after the crawling process has stored a threshold number of crawling results into the memory device.

13. The system of claim 12, wherein the audit process is further operative to pause when the number of crawling results stored in the memory device is less than a minimum number.

14. A method for performing a vulnerability assessment of a target object and providing results thereof to a user, the method comprising the steps of:

receiving input identifying a target object to assess;

conducting a crawling process on the identified object;

storing the results of the crawling process into a queue in a memory storage device;

conducting an audit process while the crawling process is still in operation and results are still being stored into the memory storage device;

extracting one or more of the stored results of the crawling process from the memory storage device and providing them to the audit process;

storing the results of the audit process into the memory storage device;

extracting the stored results of the audit process from the memory storage device and providing them to the crawling process, while the crawling process is still in operation, for further crawling; and allocating processing power to the co-operating crawling process and the audit process based on the number of results existing in the queue.

15. The method of claim 14, wherein the step of conducting an audit process is initiated once a threshold number of results from the crawling process have been stored in the memory storage device.

* * * * *